Patented Aug. 23, 1932

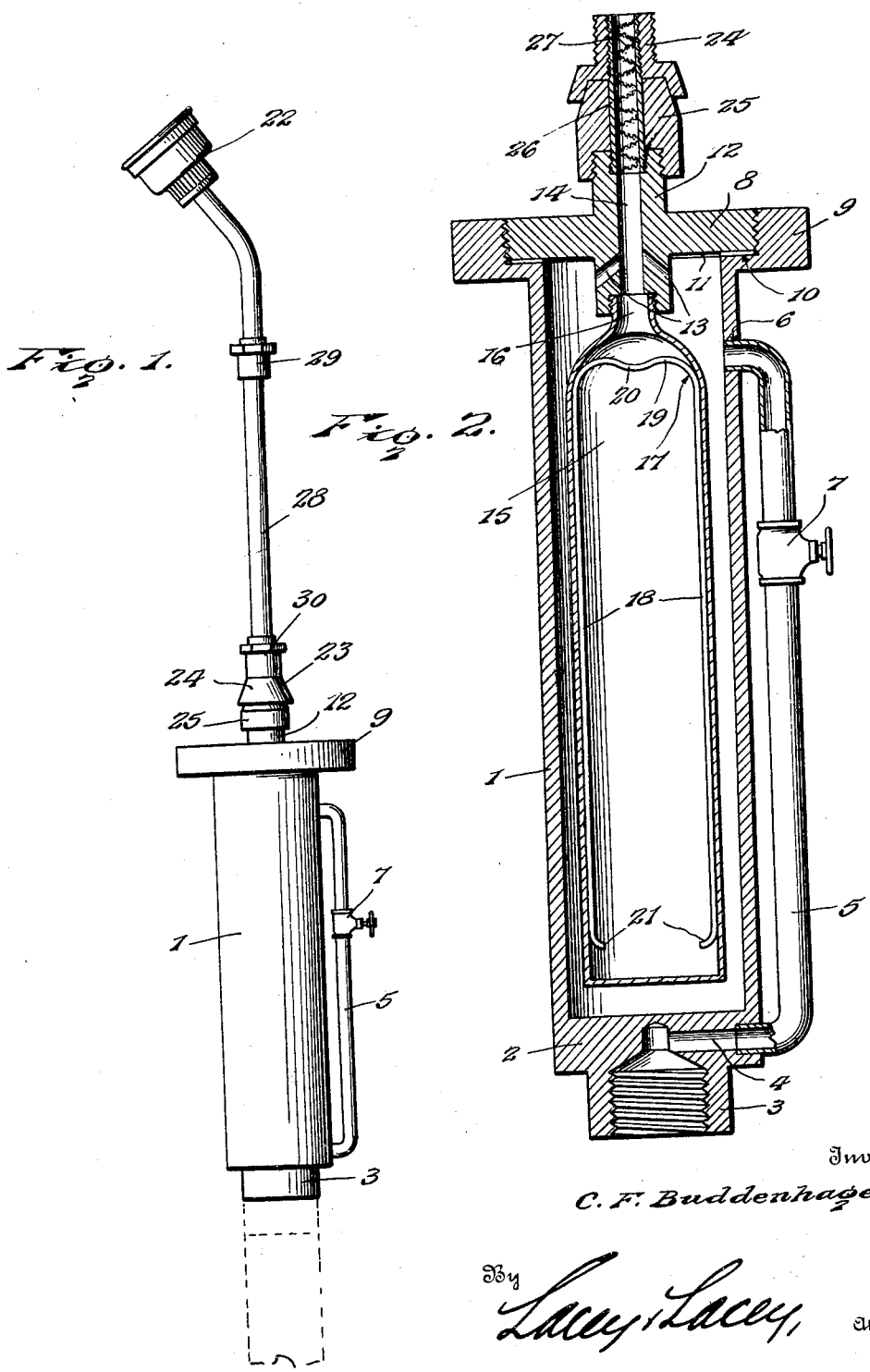

1,873,817

UNITED STATES PATENT OFFICE

CHARLES F. BUDDENHAGEN, OF PROVIDENCE, RHODE ISLAND, ASSIGNOR TO CLETUS G. BUDDENHAGEN, OF ATLANTIC, MASSACHUSETTS

SPRAYER

Application filed August 25, 1930. Serial No. 477,659.

This invention relates to sprayers and more particularly to a spraying device adapted to be applied to a hose of the type employed for watering lawns and flowers and one object of the invention is to provide a device of this character which may be applied to the hose in place of the usual nozzle and by means of which insecticide may be mixed with water delivered by the hose.

Another object of the invention is to provide a device of this character wherein pressure of water passing through a casing of the sprayer may serve to force the insecticide from a compressible container within the casing and thereby insure proper delivery of the insecticide to the water when the sprayer is in use.

Another object of the invention is to permit an insecticide container from which all of the insecticide has been discharged to be very easily removed and a new one substituted.

Another object of the invention is to permit flow of water into the casing to be regulated and by so doing control the pressure of the water.

Another object of the invention is to provide a compressible insecticide containing tube which may be readily compressed by water in the casing in order to discharge the insecticide but prevent the outlet end of the tube from being choked.

The invention is illustrated in the accompanying drawing, wherein,

Figure 1 is a side elevation of the improved sprayer, and

Fig. 2 is a longitudinal sectional view through the sprayer.

The improved sprayer is intended to be applied to a hose of the type ordinarily used for watering gardens and comprises a casing 1 which is cylindrical in shape and provided at one end with a head 2 carrying a nipple 3. This nipple is internally threaded, as shown in Fig. 2, thereby permitting the sprayer to be screwed tightly upon the hose after the usual nozzle has been removed therefrom. A passage 4 leads from the inner or forward end of the nipple and communicates with the rear end of a pipe or conduit 5 which extends longitudinally of the casing and has its forward end secured in an opening 6 formed through a side wall of the casing in spaced relation to the forward end thereof. Intermediate its length the pipe or conduit 5 carries a valve 7 by means of which flow of water through the pipe may be controlled.

The casing 1 is open at its forward end and in order to close the open end of the casing, there has been provided a head 8 which has threaded engagement with an internally threaded collar 9 formed about the forward end of the casing. The internal diameter of the collar is greater than the diameter of the casing, thereby forming an annular shoulder 10. Between this shoulder and the inner face of the head 8 is disposed a gasket 11 which serves to form a tight joint and prevent water from leaking at the forward end of the casing. At its center the head 8 carries a neck 12 which projects inwardly and outwardly from the head and the inner end portion of the neck is formed with side ports 13 which converge forwardly and establish communication between the interior of the casing and the bore 14 of the neck. Since the side ports extend forwardly in converging relation to each other and are formed in spaced relation to the inner or rear end of the neck, streams of water passing through these ports will have a tendency to create a suction in the inner end portion of the bore 14. This suction will tend to draw insecticide from the container or tube 15. This tube is collapsible and in formation is similar to those used for tooth paste and similar materials, which are to be discharged by applying pressure to the tube. The neck 16 at the forward end of the tube is threaded into the rear end of the bore 14 and from an inspection of Fig. 2 it will be readily seen that when the valve 7 is opened in order to admit water to the casing, this water will be under pressure and sufficient pressure will be exerted within the casing to compress the tube and force the insecticide through its neck 16 in order that the insecticide may enter the bore of the neck 12 and become mixed with water passing through the ports 13 into the bore 14. Pressure within the casing would be liable to compress the walls of the tube about the inner end of the neck 16 and in order to prevent this happening and choking the neck so that passage of insecticide through the neck would be interfered with, there has been provided a bracing device 17. This bracing device extends longitudinally of the tube and consists of a strand of resilient material bent intermediate its length to form arms 18 joined by a bridge 19 at their forward ends. The bridge extends diametrically through the tube near the outer or forward end thereof and this bridge is spaced from the inner end of the neck 16 and bent intermediate its ends in a reversed curve, as shown at 20. By this arrangement the tube may be easily compressed in order to discharge the insecticide through the neck 16 but there will be no danger of the tube being pressed together about the inner end of the neck 16 and preventing passage of the insecticide through this neck. The free ends of the arms are bent towards each other, as shown at 21, thereby eliminating danger of these arms puncturing the walls of the container.

In order to connect a nozzle 22 with the neck 12 of the sprayer head 8, there has been provided a coupling 23 consisting of inner and outer coupler sections 24 and 25 through which extends a tube 26. The inner section 25 is threaded upon the outer end of the neck 12 and the tube 26 is threaded into the section 24 and passes through the section 25 with its inner end protruding therefrom and threaded into the neck 12. This tube carries a strip of screening 27 which extends spirally through the tube and serves to impart a whirling motion to water passing through the tube. Therefore, as the water and insecticide passes through this tube, motion imparted to the water by the screen will cause the insecticide to be very thoroughly mixed with the water. The tube 28 of the nozzle which may be formed in sections if so desired by a coupling 29 has its inner end provided with a sleeve 30 which is internally threaded so that it may be screwed upon the neck of the coupler section 24. It will thus be seen that the water having the insecticide mixed therewith will pass through the tube 28 to the nozzle 22 from which it will be discharged in a spray and the insecticide and water may be sprayed upon trees and plants in a very effective manner.

Having thus described the invention, I claim:

1. A spraying device comprising a casing having at its front end a discharge duct opening into the casing and side ducts leading from the discharge duct in spaced relation to its inner end and opening into said casing, a collapsible container for insecticide in said casing detachably engaged with the inner end of the discharge duct, said casing being provided at its rear end with a nipple for engagement with a hose, the rear end of the casing being formed with a transversely extending passage leading from said nipple, and a conduit having one end thereof connected with the passage and its other end discharging into the front end of the casing at a point adjacent the side ducts.

2. A spraying device comprising a casing having at its front end a discharge duct and side ducts leading from said discharge duct and communicating with the interior of the casing, a collapsible container for insecticide disposed within the casing and communicating with the discharge duct, a bracing device disposed within the container and having a portion thereof bearing against the side walls of the container and another portion thereof extended transversely across the discharge duct, a threaded nipple at one end of the casing for attachment to a hose, a liquid passage communicating with said nipple, a conduit having one end thereof connected with the liquid passage and its other end communicating with the interior of the casing near the side ducts, and a valve disposed in said conduit.

3. A spraying device comprising a casing having one end thereof open and its other end provided with an internally threaded nipple, a head forming a closure for the open end of the casing and provided with a neck projecting beyond the upper and lower faces of the head, said neck being formed with a central discharge duct and having side ducts formed therein in spaced relation to the inner face of the head and communicating with the interior of the casing and said discharge duct respectively, a collapsible container for insecticide disposed within the casing and operatively connected with the neck, there being a transverse liquid passage formed in the casing and communicating with the nipple, a conduit having one end thereof connected with said liquid passage and its other end extended to a point near the front end of the casing and discharging into the interior thereof, and means carried by the conduit for regulating the discharge of liquid therethrough.

In testimony whereof I affix my signature.

CHARLES F. BUDDENHAGEN. [L. S.]